(No Model.)

I. CULVER.
SCREW CUTTING HEAD.

No. 274,281. Patented Mar. 20, 1883.

Witness,
E. W. Laird
G. W. Tibbitts

Inventor,
Ira Culver.
By Geo. W. Tibbitts Atty.

UNITED STATES PATENT OFFICE.

IRA CULVER, OF CLEVELAND, OHIO.

SCREW-CUTTING HEAD.

SPECIFICATION forming part of Letters Patent No. 274,281, dated March 20, 1883.

Application filed August 7, 1882. (No model.)

*To all whom it may concern:*

Be it known that I, IRA CULVER, of Cleveland, in the county of Cuyahoga and State of Ohio, have invented certain new and useful Improvements in Screw-Cutting Heads, of which the following is a specification.

The nature and objects of these improvements will fully appear from the subjoined description when considered in connection with the accompanying drawings, in which—

Figure 1:
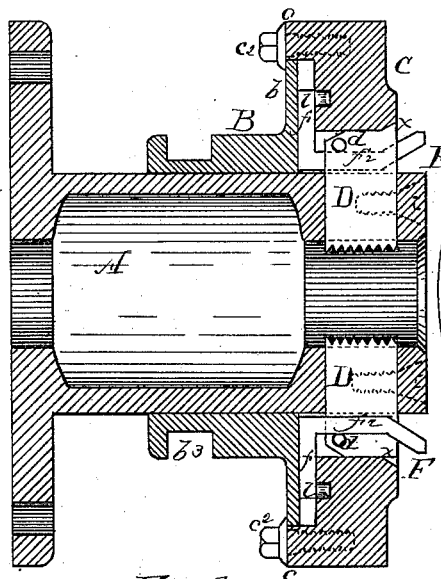
Figure 2:
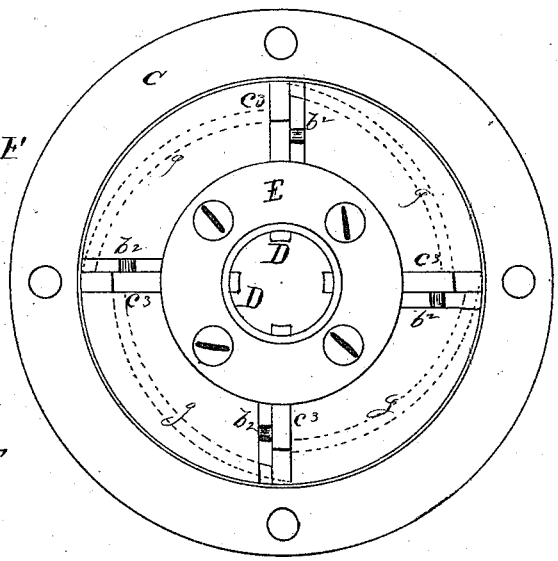
Figure 4:
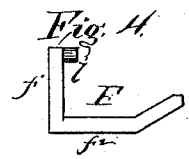
Figure 5:
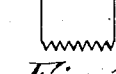
Figure 3:
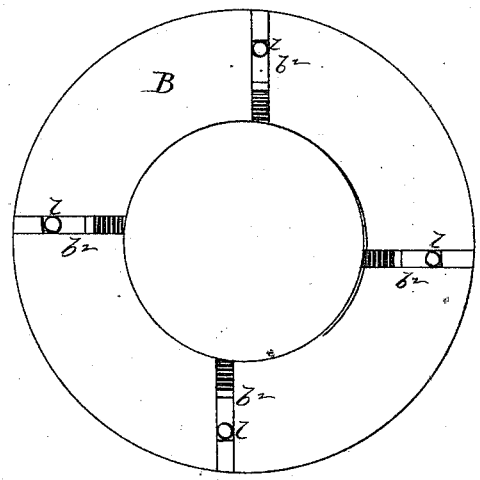

Figure 1 is a longitudinal section. Fig. 2 is an end or face view. Fig. 3 is a face view of sliding collar, showing radial grooves. Fig. 4 is a detached view of an angle-lever which plays in one of the said radial grooves. Fig. 5 is a detached view of one of the cutting-dies.

In the said drawings, A is a hollow spindle, having a wide flange, $a$, for securing it to the face-plate of a lathe. B is a sliding collar, fitted to slide on said spindle. It has a broad flange, $b$, in the face of which are made radial grooves $b^2$, and the neck of said collar has an annular groove, $b^3$, for a ring and lever for operating said collar.

C is a ring having a rim or annular flange, $c$, which fits over the periphery of the said collar-flange $b$, and is secured thereon by means of screws $c^2$, screwed into the back of said ring, the flanges of said screws lapping over onto the edge of said collar-flange, as seen in Fig. 1. The said ring C has radial grooves $c^3$, opening into the center hole, for holding the cutting-dies D. A smaller ring, E, is placed on the face of said ring C, secured by screws, which partly cover the said grooves $c^3$, and holds the dies D in place. F is an angle-lever, the arm $f$ of which lies in the groove $b^2$ of the said collar-flange $b$, and has a lug, $l$, which fits in an eccentric groove, $g$, in the inside face of the aforesaid ring C. (Seen in dotted lines in Fig. 2.) The arm $f^2$ of said angle-lever F passes out through the groove $c^3$, and has its outer end bent outward at an angle of about thirty-six degrees, for a purpose hereinafter shown. The cutting-dies have their rear upper corners beveled off at the same angle as the said lever is bent, and also are provided with a short pin, $d$, which lies against the inside surface of the said lever, as seen in Fig. 1. The outer edge of the said grooves $c^3$ in ring C are also beveled slightly, as seen at $x$, Fig. 1.

The operation of this device is as follows: The levers F are for expanding the cutting-dies after having performed their work for removing the bolt. This is accomplished by pushing backward the collar B on the spindle A, carrying with it (the collar) the levers, which slide along under the pins $d$ until they reach the incline bend at the outer ends of said levers. Then said pins, riding upward on the said inclines, withdraw the dies sufficiently to relieve the bolt, which may then be withdrawn. An adjustable stop on the spindle may be used to limit the throw of the collar, otherwise the dies would be liable to fall out of their grooves. For the convenience of removal of the dies for replacement by others or sharpening, or any other purpose, the said collar may be pushed clear back when the said stop is removed, thus leaving the slots or grooves in the end of spindle exposed, either for the insertion or withdrawal of the dies.

The purpose of the eccentric grooves in ring C is to adjust the said levers in relation to the length of cutting-dies, which is done by loosening the screws $c^2$ and turning the ring C to the right or left, as may be needed, said screws binding said ring to the flange of collar and gripping tightly said levers.

Having described my invention, I claim—

1. The bent lever F, having the lug $l$ and the bent angle-incline on outer end, as and for the purpose specified.

2. The combination of the bent levers F with the collar B, ring C, dies D, and hollow spindle A, all constructed and operating substantially in the manner and for the purpose specified.

IRA CULVER.

Witnesses:
GEO. W. TIBBITTS,
M. G. NORTON.